Nov. 9, 1937.  P. S. BARNHART  2,098,223
LAMINATED SHEET OF PAPER OR LIKE MATERIAL
Filed Jan. 15, 1936
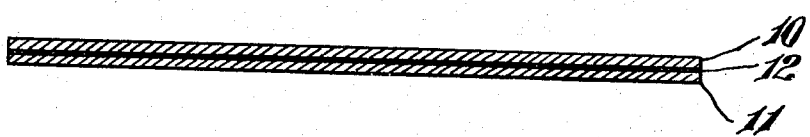
INVENTOR
Philip S. Barnhart
BY
Marshall + Hensley.
ATTORNEYS.

Patented Nov. 9, 1937

2,098,223

UNITED STATES PATENT OFFICE 2,098,223

LAMINATED SHEET OF PAPER OR LIKE MATERIAL

Philip S. Barnhart, Westfield, Mass., assignor to Westfield River Paper Company, Russell, Mass., a corporation of Massachusetts Application January 15, 1936, Serial No. 59,310

4 Claims. (Cl. 154—50)

This invention relates to laminated sheets of paper or like material.

In the paper trade there has been considerable demand for moisture proof or moisture resisting paper.

Moreover, it has been found that two sheets of semi-transparent paper, such as paper known in the trade as glassine paper, when united or laminated by a semi-transparent binder, are more transparent than a single sheet of a weight equivalent to the combined weights of the two sheets.

This is partially due to the fact that the paper, when finished, has on its surfaces small light marks known as wire marks. When the sheets are laminated by the use of the cement, the surfaces united lose such marks effecting greater transparency.

Paper sheets have been laminated by the use of wax, such as paraffin wax as a binder. Such laminated sheets when subjected to a temperature of approximately 180° F. tend to separate and when subjected to low temperatures the binder tends to become hard and crystalline causing the sheets to separate very easily. Obviously, both of these results are detrimental and undesirable.

This invention has for its salient object to provide a laminated sheet comprising a pair of sheets secured together by a cement or binder so constituted that the sheets will not separate at higher temperatures, and will be flexible at low temperatures.

Another object of the invention is to provide a laminated glassine sheet comprising a pair of sheets so united the combined sheets will not lose their semi-transparent quality.

Another object of the invention is to provide a laminated sheet having moisture proof or superior mositure resistant qualities.

Further objects will be clear from the following specification taken in connection with the drawing which shows a section of a laminated sheet constructed in accordance with the invention.

The cement or binder found most satisfactory for uniting the sheets of paper consists of a compound comprising wax, rosin, rubber and petrolatum. For best results paraffin wax having a melting point of 143° F.–155° F., petrolatum having a melting point of approximately 125° F., a clear rosin, such as grade X, and crepe rubber are used. The two last named ingredients are particularly recommended in a binder for uniting glassine sheets since, in combination with the other ingredients they give a semi-transparent cement.

The wax found most suitable for use is paraffin wax with an approximate melting point of 155° F. This wax has the desired moisture proof or moisture resisting properties, but is not a stable bond at higher temperatures, such as 180°. Sheets joined by wax will separate at such temperatures. Furthermore, the wax becomes brittle and is not flexible at low temperatures.

It was therefore necessary to combine with the wax other ingredients having the desired adhesive qualities to render the cement or bonding material stable and effective at high and low temperatures.

Such ingredients were found in rosin and rubber. The former is fluid when melted and has the desired "tackiness" when mixed with the proper plasticizers.

Rubber gives the cement the desired stability or effectiveness under high and low temperature conditions.

For a plasticizer, petrolatum with a melting point of approximately 125° F. has been found effective.

The sheets may be laminated or united in any desired manner, but are preferably joined by coating one sheet with the cement and bringing the other sheet into juxtaposition therewith and uniting the sheets under pressure.

The drawing illustrates two sheets 10 and 11 united by cement or bonding material 12 having the composition hereinbefore described. The sheets of paper may be of any desired type, such as two sheets of glassine paper or a sheet of glassine paper and a sheet of label or print paper.

Although one specific embodiment of the invention has been particularly described, it is to be understood that changes or substitutions of equivalents may be made without departing from the spirit or scope of the invention, as expressed in the following claims.

What I claim is:

1. A laminated paper sheet comprising a pair of sheets of glassine paper united by a binder composed of a mixture of paraffin wax having a melting point of approximately 155° F., rosin, rubber and petrolatum having a melting point of approximately 125° F., said ingredients being combined in the following approximate proportions, namely, wax 40–63%, rosin 20–45%, rubber 3–12% and petroleum 7–13%.

2. A laminated paper sheet comprising a pair of sheets of glassine paper united by a binder composed of a mixture of paraffin wax having a melting point of approximately 155° F., rosin, rubber and petrolatum having a melting point of approximately 125° F., said ingredients being combined in the following approximate proportions, namely, wax 60%, rosin 27%, rubber 5% and petrolatum 8%.

3. A laminated paper sheet comprising a pair of sheets of glassine paper united by a cement or binder composed of a mixture of paraffin wax, rosin, rubber and petrolatum, said ingredients being thoroughly intermixed and combined in the following proportions, namely: wax 40-63%, rosin 20-45%, rubber 3-12% and petrolatum 7-13%.

4. A laminated paper sheet comprising a pair of sheets of glassine paper united by a cement or binder consisting of paraffin wax 40-63%, rosin 20-45%, rubber 3-12% and petrolatum in an amount sufficient to produce an adhesive adapted for laminating glassine paper sheets into a laminated sheet which is transparent, moisture-proof and effective at high and low temperatures.

PHILIP S. BARNHART.